(12) United States Patent
Nishijima et al.

(10) Patent No.: US 11,765,196 B2
(45) Date of Patent: Sep. 19, 2023

(54) ATTACK SCENARIO SIMULATION DEVICE, ATTACK SCENARIO GENERATION SYSTEM, AND ATTACK SCENARIO GENERATION METHOD

(71) Applicant: Hitachi, Ltd., Tokyo (JP)

(72) Inventors: Katsuya Nishijima, Tokyo (JP); Tomohiro Shigemoto, Tokyo (JP); Nobutaka Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 344 days.

(21) Appl. No.: 17/204,065

(22) Filed: Mar. 17, 2021

(65) Prior Publication Data

US 2022/0053012 A1 Feb. 17, 2022

(30) Foreign Application Priority Data

Aug. 17, 2020 (JP) ................................. 2020-137543

(51) Int. Cl.
*H04L 29/00* (2006.01)
*H04L 9/40* (2022.01)

(52) U.S. Cl.
CPC ................................ *H04L 63/1433* (2013.01)

(58) Field of Classification Search
CPC .. H04L 63/1433; H04L 63/1441; G06F 21/55
See application file for complete search history.

(56) References Cited

U.S. PATENT DOCUMENTS

| 8,881,288 | B1 * | 11/2014 | Levy | G06F 21/577 |
| | | | | 709/225 |
| 9,654,485 | B1 * | 5/2017 | Neumann | H04L 63/1416 |
| 10,965,696 | B1 * | 3/2021 | Amram | G06N 20/00 |
| 2006/0130145 | A1 * | 6/2006 | Choi | H04L 63/1408 |
| | | | | 726/24 |
| 2009/0077666 | A1 * | 3/2009 | Chen | G06F 21/577 |
| | | | | 726/25 |

(Continued)

FOREIGN PATENT DOCUMENTS

| CN | 106899435 A | * 6/2017 | ......... H04L 41/0631 |
| WO | WO 2017/126041 A1 | 7/2017 | |

OTHER PUBLICATIONS

Extended European Search Report issued in European Application No. 21162185.9 dated Sep. 3, 2021 (eight (8) pages).

*Primary Examiner* — Don G Zhao
(74) *Attorney, Agent, or Firm* — Crowell & Moring LLP

(57) ABSTRACT

Attack scenario information describes each state of an information processing system to be attacked and an attack scenario including a chain of actions that can be taken in the state, an action that transitions from a first state to a second state is obtained with reference to state information, action information, and attack tactics information, a reward of the action is obtained with reference to reward information, the action information, and the attack tactics information, an expected reward of the reward of the action that transitions from the first state to the second state is obtained with reference to success probability information, the highest expected reward is set as a state value of reinforcement learning of the first state among the expected rewards of the action, and the attack scenario is generated by the reinforcement learning.

7 Claims, 21 Drawing Sheets

(56) References Cited

U.S. PATENT DOCUMENTS

| | | | |
|---|---|---|---|
| 2009/0183061 A1* | 7/2009 | Beneditto | G06F 21/554 |
| | | | 707/999.1 |
| 2009/0208910 A1* | 8/2009 | Brueckner | G09B 19/0053 |
| | | | 434/11 |
| 2014/0157415 A1 | 6/2014 | Abercrombie et al. | |
| 2016/0044057 A1* | 2/2016 | Chenette | H04L 63/1433 |
| | | | 726/1 |
| 2018/0239902 A1* | 8/2018 | Godard | G06F 21/53 |
| 2018/0255091 A1* | 9/2018 | Mestha | H04L 63/1416 |
| 2019/0042761 A1 | 2/2019 | Wang et al. | |
| 2019/0222604 A1* | 7/2019 | Vaidya | H04L 63/1416 |
| 2019/0238583 A1* | 8/2019 | Vaidya | G06F 30/20 |
| 2019/0258953 A1 | 8/2019 | Lang et al. | |
| 2020/0059481 A1* | 2/2020 | Sekar | H04L 63/1425 |
| 2020/0065704 A1 | 2/2020 | Nag et al. | |
| 2020/0082097 A1* | 3/2020 | Poliakov | G06F 21/577 |
| 2020/0244698 A1* | 7/2020 | Pal | H04L 63/1466 |
| 2021/0264038 A1* | 8/2021 | Butchko | G06N 7/01 |
| 2021/0320945 A1* | 10/2021 | Black | H04L 41/0816 |
| 2021/0360017 A1* | 11/2021 | Primor | H04L 63/145 |

\* cited by examiner

FIG. 4

EXECUTION ENVIRONMENT CONFIGURATION TABLE 141

| 141a | 141b | 141c | 141d | 141e | 141f | 141g | 141h |
|---|---|---|---|---|---|---|---|
| HOST ID | HOST NAME | GENERAL USER | ADMINISTRATOR USER | SOFTWARE | NETWORK | IP ADDRESS | VALUE |
| 1 | SUBSIDIARY TERMINAL | user1 | admin1 | windows 10 | NW1 | 10.0.0.1 | 1 |
| 2 | OFFICE TERMINAL | user2 | admin1 | windows 10 | NW2 | 192.168.1.1 | 1 |
| 3 | DB MANAGEMENT TERMINAL | user3 | admin1 | windows 10 | NW2 | 192.168.1.2 | 3 |
| 4 | Web SERVER | user4 | admin2 | Apache 2.x.x | NW3 | 172.16.1.1 | 5 |
| 5 | DB SERVER | user5 | admin2 | MySQL 5.x.x | NW3 | 172.16.1.2 | 20 |

FIG. 5

FW RULE TABLE   142

| FW RULE ID | CONNECTION SOURCE | CONNECTION DESTINATION | AUTHENTICATION PROTOCOL |
|---|---|---|---|
| 1 | NW1 | NW2 | ICMP<br>3389/tcp |
| 2 | NW2 | NW3 | ICMP<br>22/tcp<br>80/tcp<br>443/tcp<br>3306/tcp |

VULNERABILITY TABLE 143

| VULNERABILITY ID | SOFTWARE | CVSS SCORE |
|---|---|---|
| 1 | Apache 2.x.x | 7 |
| 2 | MySQL 5.x.x | 9 |

ATTACK TACTICS TABLE 144

| 144a | 144b | 144c | 144d | 144e | 144f |
|---|---|---|---|---|---|
| ATTACK TACTICS ID | ATTACK TACTICS NAME | PREREQUISITE | EVENT | SUCCESS PROBABILITY | COST |
| 1 | ACCOUNT DISCOVERY | •WITH GENERAL USER PRIVILEGES OR ADMINISTRATOR PRIVILEGES TO BE ATTACKED | USER INFORMATION ACQUISITION | 0.9 | 1 |
| 2 | CREDENTIAL DUMPING | •WITH GENERAL USER PRIVILEGES OR ADMINISTRATOR PRIVILEGES TO BE ATTACKED | PASSWORD INFORMATION ACQUISITION | 0.6 | 2 |
| 3 | PRIVILEGE ESCALATION | •WITH GENERAL USER PRIVILEGES TO BE ATTACKED | ADMINISTRATOR PRIVILEGE ACQUISITION | 0.6 | 2 |
| 4 | REMOTE SYSTEM SCANNING | •FW ALLOWED | HOST INFORMATION ACQUISITION | 0.8 | 2 |
| 5 | NETWORK SERVICE SCANNING | • WITH IP ADDRESS TO BE ATTACKED •FW ALLOWED | SOFTWARE INFORMATION ACQUISITION | 0.7 | 1 |
| 6 | REMOTE ACCESS | • WITH IP ADDRESS TO BE ATTACKED •FW ALLOWED •WITH USER NAME OF ACCOUNT TO BE ATTACKED •WITH PASSWORD OF ACCOUNT TO BE ATTACKED | OTHER-TERMINAL PRIVILEGE ACQUISITION | 0.7 | 1 |
| 7 | REMOTE SERVICE EXPLOIT | • WITH IP ADDRESS TO BE ATTACKED •FW ALLOWED •WITH SERVICE OF TARGET IN EQUIPMENT TO BE ATTACKED | OTHER-TERMINAL ADMINISTRATOR PRIVILEGE ACQUISITION | CALCULATION FROM CVSS SCORE | CALCULATION FROM CVSS SCORE |

FIG. 8

ACQUIRED ACCOUNT TABLE 145

| ACQUIRED ACCOUNT ID 145a | USER NAME 145b | USER NAME ACQUISITION STATE 145c | PASSWORD ACQUISITION STATE 145d |
|---|---|---|---|
| 1 | user1 | 1 | 0 |
|   | user2 | 0 | 0 |
|   | user3 | 0 | 0 |
|   | user4 | 0 | 0 |
|   | user5 | 0 | 0 |
|   | admin1 | 0 | 0 |
|   | admin2 | 0 | 0 |
| 2 | user1 | 1 | 0 |
|   | user2 | 0 | 0 |
|   | user3 | 0 | 0 |
|   | user4 | 0 | 0 |
|   | user5 | 0 | 0 |
|   | admin1 | 1 | 0 |
|   | admin2 | 0 | 0 |
| 3 |   |   |   |
| 4 |   |   |   |

FIG. 9

ACQUIRED HOST TABLE 146

| ACQUIRED HOST ID (146a) | HOST IP (146b) | HOST IP ACQUISITION STATE (146c) | SOFTWARE ACQUISITION STATE (146d) |
|---|---|---|---|
| 1 | 10.0.0.1 | 0 | 0 |
|   | 192.168.1.1 | 0 | 0 |
|   | 192.168.1.2 | 0 | 0 |
|   | 172.16.1.1 | 0 | 0 |
|   | 172.16.1.2 | 0 | 0 |
| 2 | 10.0.0.1 | 0 | 0 |
|   | 192.168.1.1 | 1 | 0 |
|   | 192.168.1.2 | 0 | 0 |
|   | 172.16.1.1 | 0 | 0 |
|   | 172.16.1.2 | 0 | 0 |
| 3 | 10.0.0.1 | 0 | 0 |
|   | 192.168.1.1 | 1 | 0 |
|   | 192.168.1.2 | 0 | 0 |
|   | 172.16.1.1 | 0 | 0 |
|   | 172.16.1.2 | 1 | 0 |
| 4 |   |   |   |
| 5 |   |   |   |

FIG. 10

STATE TABLE 147

| STATE ID (147a) | HOST ID (147b) | AUTHORIZATION (147c) | ACQUIRED ACCOUNT ID (147d) | ACQUIRED HOST ID (147e) |
|---|---|---|---|---|
| 1 | 1 | GENERAL | 1 | 1 |
| 2 | 1 | ADMINISTRATOR | 1 | 1 |
| 3 | 1 | ADMINISTRATOR | 2 | 1 |
| 4 | 1 | ADMINISTRATOR | 3 | 1 |
| 5 | 1 | ADMINISTRATOR | 3 | 2 |
| 6 | 3 | ADMINISTRATOR | 3 | 2 |
| 7 | 3 | ADMINISTRATOR | 3 | 3 |
| 8 | 3 | ADMINISTRATOR | 3 | 4 |
| 9 | 5 | ADMINISTRATOR | 3 | 4 |
| 10 | 3 | ADMINISTRATOR | 3 | 5 |
| 11 | 3 | ADMINISTRATOR | 3 | 6 |
| 12 | 4 | ADMINISTRATOR | 3 | 6 |
| 13 | 4 | ADMINISTRATOR | 4 | 6 |
| 14 | 4 | ADMINISTRATOR | 5 | 6 |
| 15 | 4 | ADMINISTRATOR | 5 | 7 |
| 16 | 5 | ADMINISTRATOR | 5 | 7 |
| 17 | | | | |
| 18 | | | | |

FIG. 11

ACTION TABLE 148

| ACTION ID | ATTACK SOURCE HOST ID | ATTACK DESTINATION HOST ID | ATTACK TACTICS ID |
|---|---|---|---|
| 1 | 1 | 1 | 3 |
| 2 | 1 | 1 | 1 |
| 3 | 1 | 1 | 2 |
| 4 | 1 | 3 | 4 |
| 5 | 1 | 3 | 6 |
| 6 | 3 | 5 | 4 |
| 7 | 3 | 5 | 5 |
| 8 | 3 | 5 | 7 |
| 9 | 3 | 4 | 4 |
| 10 | 3 | 4 | 5 |
| 11 | 3 | 4 | 7 |
| 12 | 4 | 4 | 1 |
| 13 | 4 | 4 | 2 |
| 14 | 4 | 5 | 4 |
| 15 | 4 | 5 | 6 |
| 16 | | | |
| 17 | | | |

FIG. 12

REWARD TABLE 149

| EVENT ID 149a | EVENT 149b | REWARD 149c |
|---|---|---|
| 1 | USER PRIVILEGE COMPROMISE | 1 |
| 2 | ADMINISTRATOR PRIVILEGE COMPROMISE | HOST VALUE |

FIG. 13    SUCCESS PROBABILITY RULE TABLE    150

| 150a | 150b | 150c | 150d | 150e | 150f | 150g |
|---|---|---|---|---|---|---|
| RULE ID | RULE TYPE | STATE ID | ATTACK SOURCE ID | ATTACK DESTINATION ID | ATTACK TACTICS ID | SUCCESS PROBABILITY |
| 1 | ACTUAL MACHINE EXPERIENCE | 8 | 3 | 5 | 7 | 0 |
| 2 | ACTUAL MACHINE EXPERIENCE | 20 | 1 | 5 | 4 | 0 |
| 3 | ACTUAL MACHINE EXPERIENCE | 21 | 1 | 5 | 5 | 0 |
| 4 | ACTUAL MACHINE EXPERIENCE | 22 | 1 | 5 | 6 | 0 |
| 5 | ACTUAL MACHINE EXPERIENCE EXPANSION | any | 1 | 5 | any | 0 |
| 6 | ATTACK TACTICS SUCCESS PROBABILITY | any | any | any | 1 | 0.9 |
| 7 | ATTACK TACTICS SUCCESS PROBABILITY | any | any | any | 2 | 0.6 |
| 8 | ATTACK TACTICS SUCCESS PROBABILITY | any | any | any | 3 | 0.6 |
| 9 | ATTACK TACTICS SUCCESS PROBABILITY | any | any | any | 4 | 0.8 |
| 10 | ATTACK TACTICS SUCCESS PROBABILITY | any | any | any | 5 | 0.7 |
| 11 | ATTACK TACTICS SUCCESS PROBABILITY | any | any | any | 6 | 0.7 |
| 12 | ATTACK TACTICS SUCCESS PROBABILITY | any | any | any | 7 | CALCULATION FROM CVSS SCORE |

FIG. 14A

ATTACK SCENARIO TABLE  151

| STEP | STATE ID | ACTION ID |
|---|---|---|
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |

ATTACK SCENARIO TABLE 151

| STEP | STATE ID | ACTION ID |
|------|----------|-----------|
| 1 | 1 | 1 |
| 2 | 2 | 2 |
| 3 | 3 | 3 |
| 4 | 4 | 4 |
| 5 | 5 | 5 |
| 6 | 6 | 9 |
| 7 | 10 | 10 |
| 8 | 11 | 11 |
| 9 | 12 | 12 |
| 10 | 13 | 13 |
| 11 | 14 | 14 |
| 12 | 15 | 15 |

ATTACK COMMAND TABLE  126

| 126a<br>ATTACK COMMAND ID | 126b<br>ATTACK TACTICS ID | 126c<br>ATTACK COMMAND |
|---|---|---|
| 1 | 1 | USER ACCOUNT LIST ACQUISITION COMMAND |
| 2 | 2 | CREDENTIAL LIST ACQUISITION COMMAND |
| 3 | 3 | PRIVILEGE ESCALATION COMMAND |
| 4 | 4 | ICMP ECHO COMMAND |
| 5 | 5 | SOFTWARE INFORMATION ACQUISITION COMMAND |
| 6 | 6 | RDP CONNECTION COMMAND |
| 7 | 6 | SSH CONNECTION COMMAND |
| 8 | 7 | VULNERABILITY ATTACK COMMAND |

FIG. 20

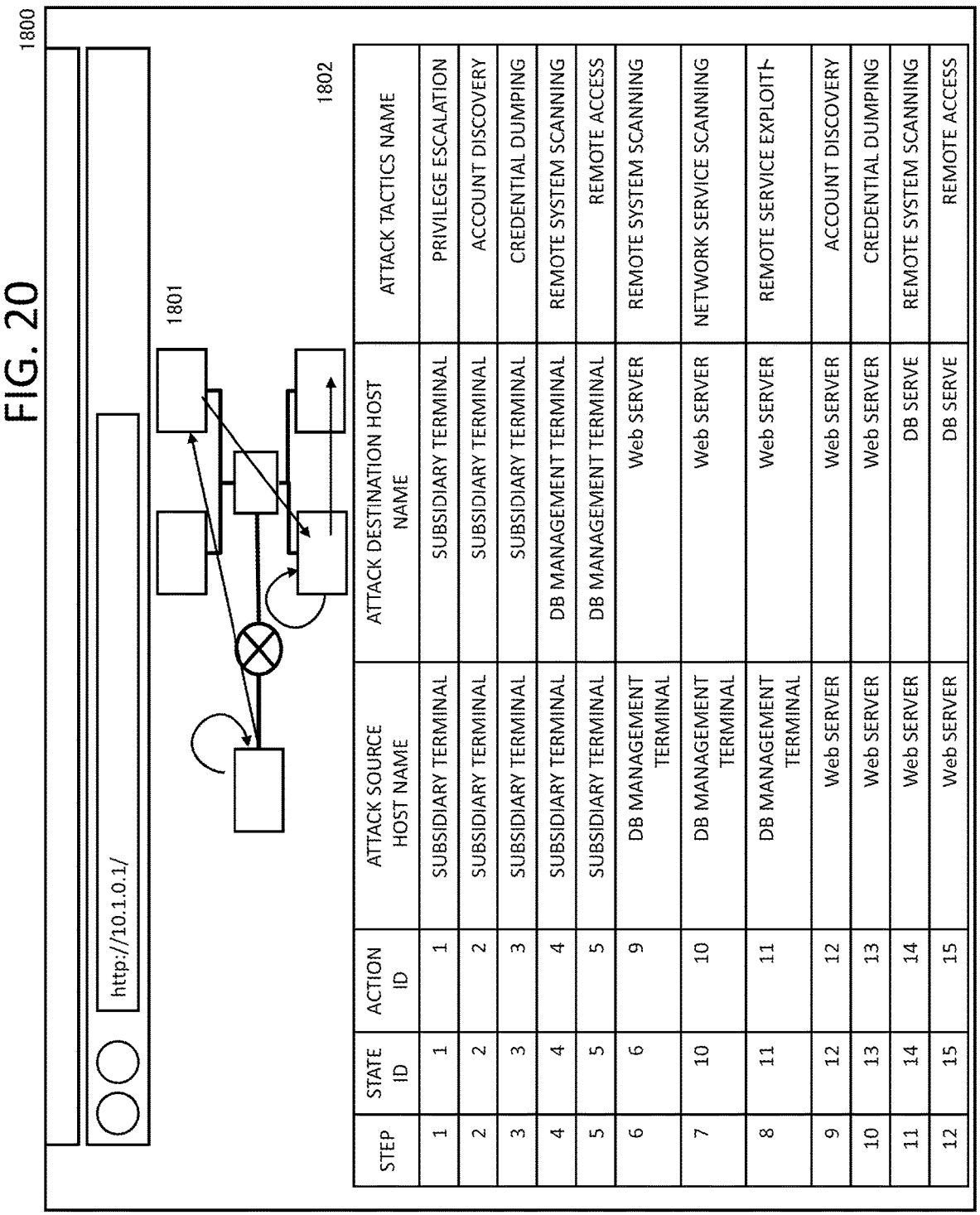

| STEP | STATE ID | ACTION ID | ATTACK SOURCE HOST NAME | ATTACK DESTINATION HOST NAME | ATTACK TACTICS NAME |
|---|---|---|---|---|---|
| 1 | 1 | 1 | SUBSIDIARY TERMINAL | SUBSIDIARY TERMINAL | PRIVILEGE ESCALATION |
| 2 | 2 | 2 | SUBSIDIARY TERMINAL | SUBSIDIARY TERMINAL | ACCOUNT DISCOVERY |
| 3 | 3 | 3 | SUBSIDIARY TERMINAL | SUBSIDIARY TERMINAL | CREDENTIAL DUMPING |
| 4 | 4 | 4 | SUBSIDIARY TERMINAL | DB MANAGEMENT TERMINAL | REMOTE SYSTEM SCANNING |
| 5 | 5 | 5 | SUBSIDIARY TERMINAL | DB MANAGEMENT TERMINAL | REMOTE ACCESS |
| 6 | 6 | 9 | DB MANAGEMENT TERMINAL | Web SERVER | REMOTE SYSTEM SCANNING |
| 7 | 10 | 10 | DB MANAGEMENT TERMINAL | Web SERVER | NETWORK SERVICE SCANNING |
| 8 | 11 | 11 | DB MANAGEMENT TERMINAL | Web SERVER | REMOTE SERVICE EXPLOIT |
| 9 | 12 | 12 | Web SERVER | Web SERVER | ACCOUNT DISCOVERY |
| 10 | 13 | 13 | Web SERVER | Web SERVER | CREDENTIAL DUMPING |
| 11 | 14 | 14 | Web SERVER | DB SERVE | REMOTE SYSTEM SCANNING |
| 12 | 15 | 15 | Web SERVER | DB SERVE | REMOTE ACCESS |

ATTACK SCENARIO SIMULATION DEVICE, ATTACK SCENARIO GENERATION SYSTEM, AND ATTACK SCENARIO GENERATION METHOD

INCORPORATION BY REFERENCE

This application claims priority based on Japanese patent application, No. 2020-137543 filed on Aug. 17, 2020, the entire contents of which are incorporated herein by reference.

BACKGROUND

The present invention relates to an attack scenario simulation device, an attack scenario generation system, and an attack scenario generation method, in particular, relates to a technique suitable for automatically generating an attack scenario used for verifying an impact of a cyberattack on an information system to reduce man-hours for generating the attack scenario.

In recent years, cyberattacks aimed at private companies and public institutions have become pronounced. The combination of attacks performed by a malicious is constantly changing, and undermining the interests and security of corporations and nations.

Therefore, in order to counter such attacks, it is important to consider a time-series procedure of an attack against an information processing system as a series of scenarios (attack scenarios), generate new attack scenarios that have a large impact on the organization, verify the attack scenarios with simulations and actual systems, and take countermeasures in advance. However, the generation of the attack scenarios requires experts familiar with attack tools and requires a lot of man-hours.

As a technique for solving the above problem, for example, there is a technique disclosed in WO2017/126041. In a training device disclosed in WO2017/126041, a basic attack scenario expressed in the function of an equipment and a series of attack steps is rewritten to match a system configuration information using the system configuration information of a training target system as input, to generate an individual attack scenario that is an individual attack scenario for the training target system. As a result, the same training scenario can be automatically generated for multiple systems with different system configurations, and the construction period and cost of training scenario development can be reduced.

SUMMARY

In the technology disclosed in WO2017/126041, the basic attack scenario must be defined in advance. For that reason, when creating a new attack scenario, there is a need to manually create a base scenario. In addition, when a new attack method appears, an attack scenario using the attack method cannot be generated without defining a new basic attack scenario corresponding to the new attack method.

Furthermore, because computer simulations cannot fully reproduce the real environment, the attack scenarios generated on the simulation may not be applicable to the real environment. For example, the presence of inconsistencies between the simulation environment and the actual machine is an issue, such as the fact that even if an attack that exploits a vulnerability in a particular version of software is feasible in the simulation, a patch is adapted in the actual environment and attack cannot be performed.

An object of the present invention is to provide a technique that can automatically generate an attack scenario that can be adapted to a real environment without having to prepare a basic attack scenario in advance to reduce man-hours required to create the attack scenario.

A configuration of an attack scenario simulation device according to the present invention is preferably directed to an attack scenario simulation device that simulates an attack on an information processing system and generates an attack scenario against the information processing system, including a unit that holds state information for each state of the target information processing system, attack scenario information describing the state and an attack scenario including a chain of actions that can be taken in the state, action information describing a relationship between the actions and attack tactics, attack tactics information describing a prerequisite for the attack tactics and an event that occurs under the prerequisite, reward information for a reward that occurs for each event, and success probability information that stores a probability of success for each state and each attack tactic; a unit that obtains an action that transitions from a first state to a second state with reference to the state information, the action information, and the attack tactics information; a unit that obtains a reward for the action that transitions from the first state to the second state with reference to the reward information, the action information, and the attack tactics information; a unit that obtains expected rewards for the reward of the action that transitions from the first state to the second state with reference to the success probability information; and a unit that sets the highest expected reward among the expected rewards of the action that transitions from the first state to the second state as a state value of a reinforcement learning of the first state, and generates the attack scenario by the reinforcement learning.

According to the present invention, the attack scenario that can be adapted to the real environment can be automatically generated without having to prepare a basic attack scenario in advance, and the man-hours required to create the attack scenario can be reduced.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a diagram showing an example of an execution environment configuration table;

FIG. 5 is a diagram showing an example of an FW rule table;

FIG. 6 is a diagram showing an example of a vulnerability table;

FIG. 7 is a diagram showing an example of an attack tactics table;

FIG. 8 is a diagram illustrating an example of an acquired account table;

FIG. 9 is a diagram showing an example of an acquired host table;

FIG. 10 is a diagram showing an example of a state table;

FIG. 11 is a diagram showing an example of an action table;

FIG. 12 is a diagram showing an example of a reward table;

FIG. 13 is a diagram showing an example of a success probability rule table;

FIG. 14A is a diagram showing an example of an attack scenario table (part 1);

FIG. 14B is a diagram showing an example of an attack scenario table (Part 2);

FIG. 15 is a diagram showing an example of an attack command table;

FIG. 20 is a diagram showing an example of a simulation information display screen.

DETAILED DESCRIPTION OF THE EMBODIMENTS

Hereinafter, one embodiment according to the present invention will be described with reference to FIGS. 1 to 20. The present embodiment relates to a technique for efficiently learning and generating realistic attack scenarios by learning attack scenarios in combination with a simulation environment and a real environment.

An example in which the attack scenario generation according to the following embodiment is functionally realized by execution of software by a computer will be described, but the attack scenario generation may be performed by a hardware logic.

First, the configuration of the attack scenario generation system will be described with reference to FIG. 1.

An attack scenario generation system 1 includes an attack scenario simulation device 101, an attack scenario execution device 102, and an attack scenario execution environment 103.

The attack scenario simulation device 101 is a device that simulates the attack scenario execution environment 103 and generates an attack scenario that adapts to the simulation environment. That is, the attack scenario simulation device 101 is a device for automatically generating an attack scenario that can be adapted to the real environment by creating a simulation environment simulating the attack scenario execution environment 103, generating an attack scenario using the simulation environment, executing the attack scenario in the attack scenario execution environment 103, and further improving the attack scenario using the execution result.

The attack scenario execution device 102 is a device that executes the attack scenario generated in the simulation environment on the attack scenario execution environment 103. The attack scenario execution device 102 performs a conversion process for executing the attack scenario generated in the simulation environment on the attack scenario execution environment 103.

The attack scenario execution environment 103 is a system equipped with hardware resources and software resources such as the information communication environment itself of an organization including a single or multiple devices and systems, or an environment simulated for verification. That is, the attack scenario execution environment 103 includes hardware such as a PC (Personal Computer), a server, a network equipment, or a virtual equipment that virtualizes those system elements, and is an environment that is the target of the attack scenario.

Figure 1:
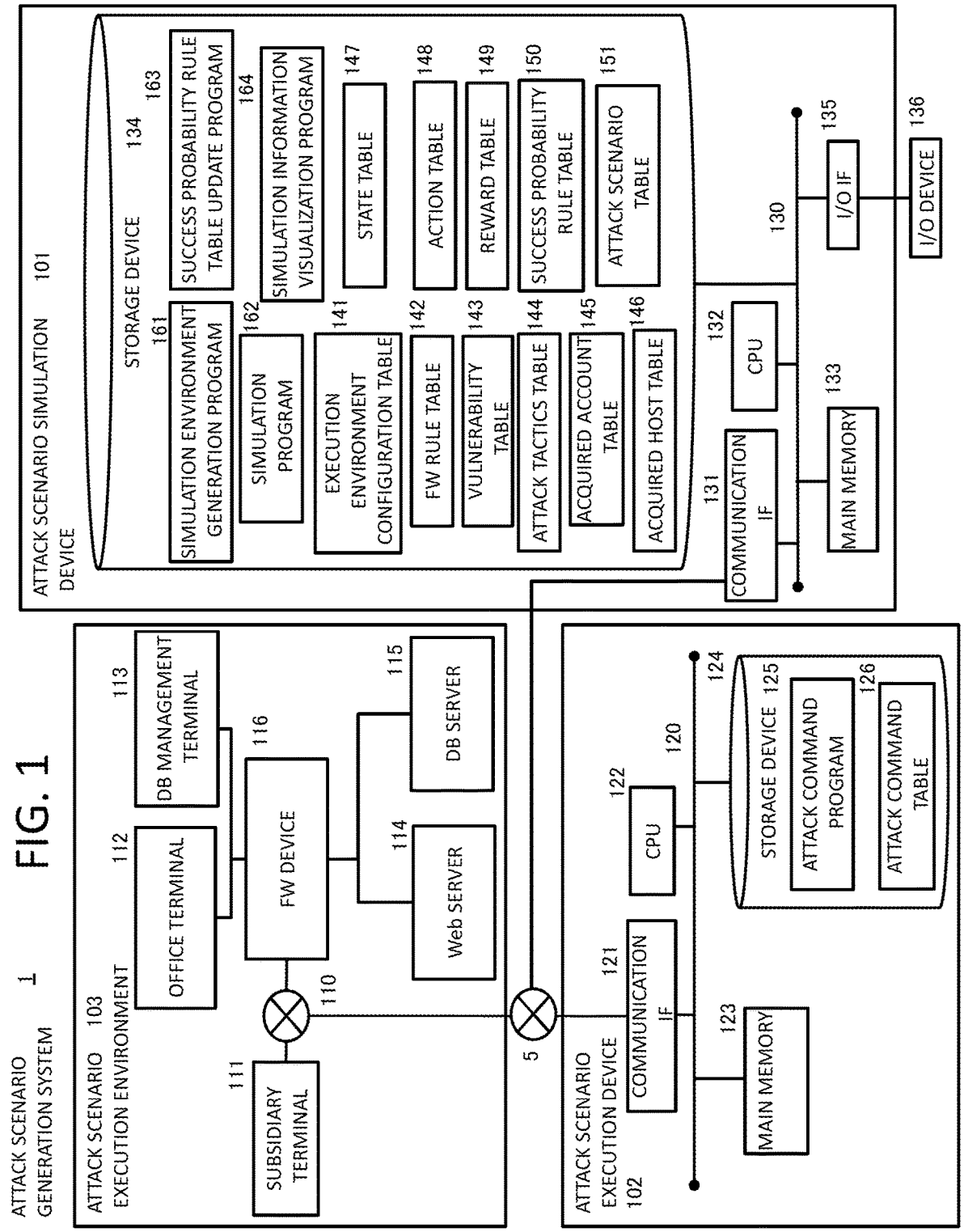
FIG. 1 is a diagram showing an overall configuration of an attack scenario generation system and a hardware and software configuration of each component.

In the example shown in FIG. 1, the attack scenario execution environment 103 includes a subsidiary terminal 111, an office terminal 112, a DB management terminal 113, a Web server 114, a DB server 115, and an FW (Firewall) device 116 on a network path connecting each equipment together, and those components are connected by a network 110.

The attack scenario simulation device 101, the attack scenario execution device 102, and the attack scenario execution environment 103 are connected to each other through a network 5. The network 5 may be, for example, a wired LAN (Local Area Network) or a wireless LAN, or a global network such as the Internet.

The attack scenario simulation device 101 is realized in a general information processing device such as a PC as shown in FIG. 1, and includes a communication interface (communication IF) 131, a CPU (Central Processing Unit) 132, a main memory 133, a storage device 134, an I/O interface (I/O IF) 135, and a communication path 130 that connects those components to each other.

The communication path 130 is, for example, an information transmission medium such as a bus or a cable.

The I/O IF 135 is connected to an I/O device 136 for input and output such as a keyboard and a display, and mediates the input and output of data.

The main memory 133 is, for example, a semiconductor storage device such as a RAM (Random Access Memory), which temporarily stores programs loaded from the storage device 134 and executed on the CPU 132 and necessary work data.

The CPU 132 executes a program stored in the main memory 133 and controls each unit of the attack scenario simulation device 101.

The storage device 134 is, for example, a large-capacity magnetic storage device and a semiconductor storage device such as an HDD (Hard Disk Drive) and an SSD (Solid State Drive), and stores programs executed on the CPU 132 and data used for the CPU 132.

In the present embodiment, the storage device 134 is installed with a simulation environment generation program 161, a simulation program 162, a success probability rule table update program 163, and a simulation information visualization program 164.

Some or all of these programs or tables explained below may be stored in non-temporary storage device 134 previously, or, if necessary, after they are transferred from the non-temporary storage device of other devices, the non-temporary storage device of connected to an I/F not shown, they may be stored in the storage device 134.

The simulation environment generation program 161 is a program that generates a simulation environment for simulating attack scenarios using an execution environment configuration table 141, an FW rule table 142, and a vulnerability table 143. In the present specification, the simulation environment is a software resource such as programs and data for executing the attack scenarios.

The simulation program 162 is a program that performs simulation and generates the attack scenarios using the generated simulation environment.

The success probability rule table update program 163 is a program that updates the rules for the simulation environment using the execution result when the generated attack scenario is executed in the attack scenario execution environment 103.

The simulation information visualization program 164 is a program that performs a process of displaying information about the simulation program on the I/O device 136.

Those programs are loaded into the main memory 133 and executed on the CPU 132 to realize each function.

Further, the storage device 134 stores an execution environment configuration table 141, an FW rule table 142, a vulnerability table 143, an attack tactics table 144, an acquired account table 145, an acquired host table 146, a state table 147, an action table 148, a reward table 149, a success probability rule table 150, and an attack scenario table 151. Details of each table will be described later.

The attack scenario execution device 102 is also realized in a general information processing apparatus such as a PC as shown in FIG. 1 as in the attack scenario simulation device 101, and includes a communication IF 121, a CPU 122, a main memory 123, a storage device 124, and a communication path 120 connecting those components to each other.

The functions of the respective components are the same as those of the attack scenario simulation device 101.

The storage device 124 of the attack scenario execution device 102 is installed with an attack command program 125.

The attack command program 125 is a program that attacks the attack scenario execution environment based on an attack command table 126.

Further, the storage device 124 of the attack scenario execution device 102 stores the attack command table 126. The attack command table 126 is a table that holds attack commands based on attack tactics.

Next, the functional configuration of the attack scenario simulation device will be described with reference to FIG. 2.

Figure 2:
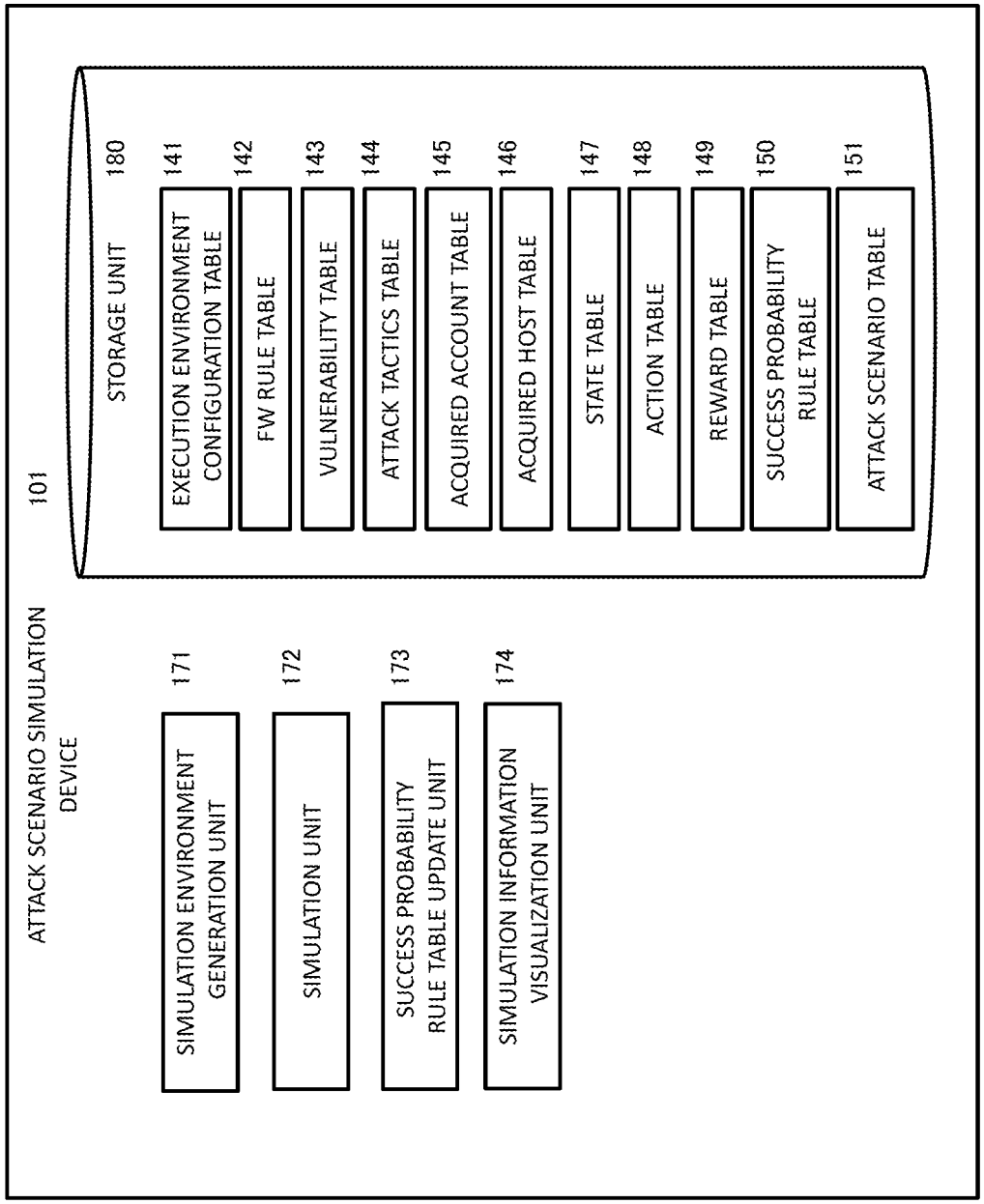
FIG. 2 is a functional configuration diagram of an attack scenario simulation device.

As shown in FIG. 2, the attack scenario simulation device 101 includes the respective functional units of a simulation environment generation unit 171, a simulation unit 172, a success probability rule table update unit 173, a simulation information visualization unit 174, and a storage unit 180.

The simulation environment generation unit 171 is a functional unit for generating a simulation environment for simulating the attack scenarios using the execution environment configuration table 141, the FW rule table 142, and the vulnerability table 143.

The simulation unit 172 is a functional unit that performs simulation and generates the attack scenario using the generated simulation environment.

The success probability rule table update unit 173 is a functional unit that performs a process of updating rules related to the simulation environment using the execution result when the generated attack scenario is executed in the attack scenario execution environment 103.

The simulation information visualization unit 174 is a functional unit for displaying the processing result of the simulation program on the I/O device 136.

The simulation environment generation unit 171, the simulation unit 172, the success probability rule table update unit 173, and the simulation information visualization unit 174 execute the simulation environment generation program 161, the simulation program 162, the success probability rule table update program 163, and the simulation information visualization program 164 in FIG. 1, respectively, to realize those functions.

Further, the storage unit 180 is stored with the execution environment configuration table 141, the FW rule table 142, the vulnerability table 143, the attack tactics table 144, the acquired account table 145, the acquired host table 146, the state table 147, the action table 148, the reward table 149, the success probability rule table 150, and the attack scenario table 151.

Next, the functional configuration of the attack scenario execution device will be described with reference to FIG. 3.

Figure 3:
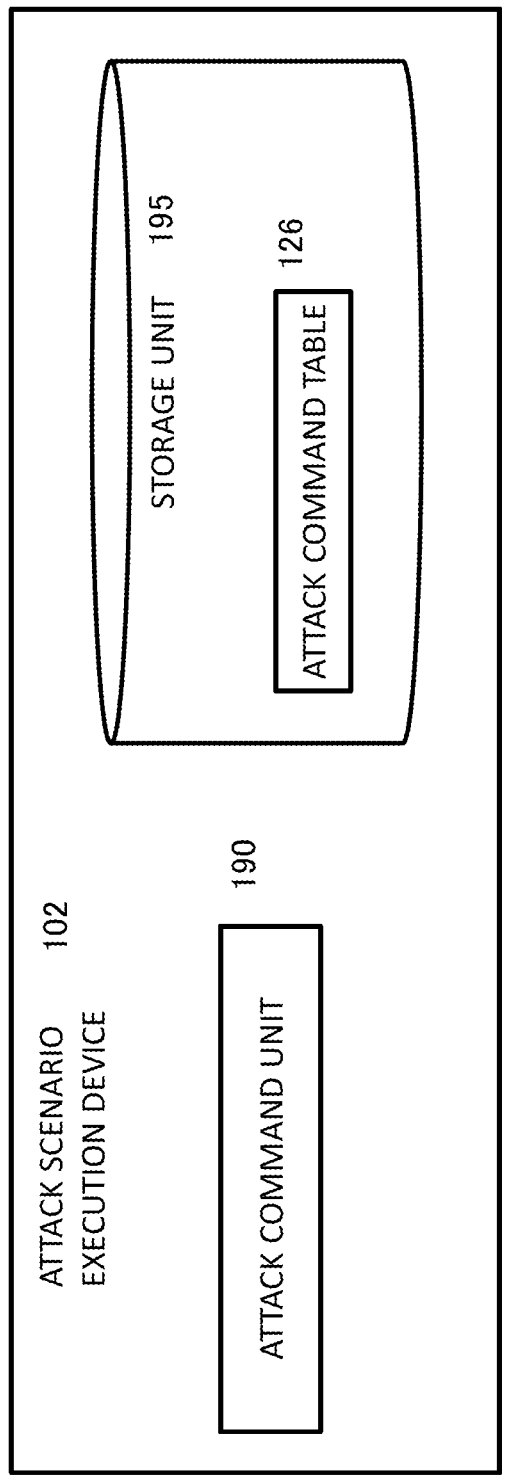
FIG. 3 is a functional configuration diagram of an attack scenario execution device.

The attack scenario execution device 102 has the respective functional units of an attack command unit 190 and a storage unit 195 as shown in FIG. 3.

The attack command unit 190 is a functional unit of attacking the attack scenario execution environment based on the attack command table 126.

With execution of the attack command program 125, the function of the attack command unit 190 is realized.

Further, the storage unit 195 of the attack scenario execution device 102 stores the attack command table 126.

Next, a data structure used in the attack scenario generation system according to the present embodiment will be described with reference to FIGS. 4 to 15.

First, an example of an execution environment configuration table will be described with reference to FIG. 4.

The execution environment configuration table 141 is a table representing the configuration of an equipment necessary to generate a simulation environment used when generating an attack scenario by simulation.

As shown in FIG. 4, the execution environment configuration table 141 includes the respective fields of a host ID 141a, a host name 141b, a general user 141c, an administrator user 141d, the software 141e, a network 141f, an IP address 141g, and a value 141h.

The host ID 141a is stored with an identifier that uniquely identifies one host corresponding to each record in the execution environment configuration table 141. In the present specification, "host" means an equipment to be attacked in the attack scenario execution environment. The host name 141b is stored with a string representing a name of the host. The general user 141c is stored with a string representing a name of a general user account registered on each host. The administrator user 141d is stored with a string representing a name of an administrator user account registered on each host. The software 141e is stored with a name and a version of the software installed and running on each host. The network 141f is stored with a string and an identifier representing the network to which each host belongs. The IP address 141g is stored with an IP address of each host. The value 141h is stored with a number representing the value of each host. Values stored in the value 141h are used to generate the attack scenarios, and as the value is more valuable for attacks to an attacker, a higher value is set to the hosts in which important data such as sensitive information is stored.

The execution environment configuration table 141 is used by the simulation environment generation unit 171 in a process for generating a simulation environment.

Details of the simulation environment generation process will be described later with reference to FIG. 17.

Next, an example of an FW rule table will be described with reference to FIG. 5.

The FW rule table 142 is a table showing connection authorization rules between each network specified by the FW device 116, and as shown in FIG. 5, includes the respective fields of an FW rule ID 142a, a connection source 142b, a connection destination 142c, and an authorization protocol 142d.

The FW rule ID 142a is stored with an identifier that uniquely identifies one record in the FW rule table 142. The connection source 142b is stored with a name or identifier representing the network of the connection source. The connection destination 142c is stored with a name or identifier representing the network of the connection destination. The authorization protocol 142d is stored with a name or identifier of the protocol for which the connection is authorized. The FW device 116 provides services by accepting the protocol specified in the authorization protocol 142d.

The FW rule table 142 is used by the simulation environment generation unit 171 in the process of generating a simulation environment.

Next, an example of a vulnerability table will be described with reference to FIG. 6.

The vulnerability Table 143 is a table is stored with information about vulnerabilities in software that are a de facto standard for security assessments, and has the respective fields of a vulnerability ID 143a, software 143b, and a CVSS (Common vulnerability scoring system) score 143c. The CVSS is a standard for assessing vulnerabilities in information systems.

The vulnerability ID 143a is stored with an identifier that uniquely identifies one record in the vulnerability table 143. The software 143b is stored with a combination of a name and version of the vulnerable software. The CVSS score 143c is stored with a base score of the CVSS score of the vulnerability of the software 143b.

The vulnerability table 143 is used to calculate the success probability 144e and cost 144f stored in the attack tactics table 144 to be described later (details will be described later).

Next, an example of the attack tactics table will be described with reference to FIG. 7.

The attack tactics table 144 is a table that stores information about attack tactics used for attacks specified in attack scenarios.

The entries in the attack tactics table 144 have each field of an attack tactics ID 144a, an attack tactic name 144b, a prerequisite 144c, an event 144d, a success probability 144e, and a cost 144f.

The attack tactics ID 144a is stored with an identifier that can uniquely identify one record in the attack tactics table 144. The attack tactic name 144b is stored with a name of the attack tactics that can be taken by a commonly known attacker. The prerequisite 144c is stored with a state of the prerequisite for performing each attack tactic. The event 144d is stored with an event name that occurs when the attack tactic name 144b succeeds. The success probability 144e is stored with the probability that each attack tactic will succeed. A value of the success probability 144e may be given randomly or, if possible, given by expert experience or calculated with reference to external information such as CVSS score so that the attack scenario execution environment can be simulated.

The cost 144f is stored with the cost of carrying out each attack tactics. The value stored in the cost 144f is used as a "negative reward" for reinforcement learning used when generating attack scenarios. The value of the cost 144f may be given randomly, or, if possible, given by expert experience or calculated with reference to external information such as CVSS score so that the attack scenario execution environment can be simulated.

The attack tactics table 144 is used by the simulation unit 172 in the process of generating the attack scenario.

The table described in FIGS. 8 to 13 below is a table to be defined when learning attack scenarios is performed by the reinforcement learning.

First, a basic concept of the reinforcement learning and a relation between the generation of attack scenarios according to the present embodiment and the reinforcement learning will be described.

In the reinforcement learning, an agent (in the present embodiment, a simulation program that attacks the simulation environment, or a virtually assumed attacker) that selects an action based on a target environment (in the present embodiment, the simulation environment generated by the simulation environment generation process) and a strategy of the agent itself according to the state of the simulation environment is defined, and the strategy is learned. In the reinforcement learning, four pieces of information of a state, an action, a state transition probability, and a reward are used. The agent performs the action according to the observed state. As a result, the state transitions to the next state according to the state transition probability. In this case, a reward function gives immediate rewards to the agent. The reinforcement learning is a method of learning a policy (action to be taken) for most rewarding the agent in such a process.

In the present embodiment, the attack scenario simulation device 101 holds all observable states as the state table 147. In the state data held by the state table 147, the acquired account table 145 and the acquired host table 146 are referred to as external data. The acquired account table 145 is a table that holds all acquisition states in which information about an account obtained from the simulation environment can be obtained in the process of executing the attack scenario. The acquired host table 146 is a table that holds all the acquisition states of information about the host obtained from the environment in the process of executing the attack scenario.

Further, the attack scenario simulation device 101 holds all actions that can be taken by the agent as the action table 148. Further, the attack scenario simulation device 101 holds the success probability rule table 150 as a table for storing data that is a source of the state transition probability.

Further, the attack scenario simulation device 101 holds the conditions of the reward obtained according to the action performed and a change in state due to a result of the action as the reward table 149.

Next, the acquired account table will be described with reference to FIG. 8.

The acquired account table 145 is a table that stores data about the account information of the simulation environment or the attack scenario execution environment that is acquired during the attack scenario execution, and as shown in FIG. 8, the acquired account table 145 has each field of an acquired account ID 145a, a user name 145b, a user name acquisition state 145c, and a password acquisition state 145d.

The acquired account ID 145a is stored with an identifier that can uniquely identify one record in the acquired account table 145. The user name 145b is stored with the name of the user registered in the simulation environment. The user name acquisition state 145c is stored with a flag representing whether or not the simulation unit 172 has acquired each user name information in a process of executing the attack scenario, and 1 of a flag value means that each user name has been acquired, and 0 means that each user name has not been acquired. The password acquisition state 145d is stored with a flag representing whether or not the simulation unit 172 has acquired the password information of each user name in the process of executing the attack scenario, and 1 of a flag value means that the password information has been acquired while 0 means that the password information has not been acquired.

The acquired account table 145 is used by the simulation unit 172 in the process of generating an attack scenario.

Next, the acquired host table will be described with reference to FIG. 9.

The acquired host table 146 is a table that stores host information of the simulation environment or the attack scenario execution environment that is acquired during the attack scenario execution, and as shown in FIG. 9, the acquired host table 146 has each field of an acquired host ID 146a, a host IP 146b, a host IP acquisition state 146c, and a software acquisition state 146d.

The acquired host ID 146a is stored with an identifier that can uniquely identify one record of the acquired host table 146. The host IP 146b is stored with an IP address of the host registered in the simulation environment. The host IP acquisition state 146c is stored with a flag representing whether or not the simulation unit 172 has acquired each host IP information in the process of executing the attack scenario, and 1 of a flag value means that each host IP has been acquired while 0 means that each host IP has not been acquired. The software acquisition state 146d is stored with a flag representing whether or not the simulation unit 172 has acquired software information running on each host IP in the process of executing an attack scenario, and 1 of a flag value means that the software information has been acquired while 0 means that the software information has not been acquired.

The acquired host table 146 is used by the simulation unit 172 in the process of generating the attack scenario.

Next, the state table will be described with reference to FIG. 10.

The state table 147 is a table that stores data about the state of the simulation environment or the actual environment during the execution of the attack scenario, and as shown in FIG. 10, the state table 147 has each field of a state ID 147a, a host ID 147b, an authorization 147c, an acquired account ID 147d, and an acquired host ID 147e.

The state ID 147a is stored with an identifier that can uniquely identify one record in the state table 147. The host ID 147b is a host ID that is performing attack processing in the attack scenario execution, and is stored with an external key of the host ID 141a of the execution environment configuration table 141. The authorization 147c is stored with a value of the authorization (general, administrator, etc.) of the user who is performing the attack processing. The acquired account ID 147d is stored with an external key for referring to the relevant acquired account ID 145a of the acquired account table 145. The acquired host ID 147e is stored with an external key for referring to the relevant acquired host ID 146a of the acquired host table 146.

The state table 147 is used by the simulation unit 172 in the process of generating an attack scenario.

Next, an example of the action table will be described with reference to FIG. 11.

The action table 148 is a table that stores data about actions that can be taken by the attacker in the attack scenario, and as shown in FIG. 11, the action table 148 has each field of an action ID 148a, an attack source host ID 148b, an attack destination host ID 148c, and an attack tactics ID 148d.

The action ID 148a is stored with an identifier that can uniquely identify one record in the action table 148. The attack source host ID 148b is an attack source host ID of each action, and stored with an external key of the host ID 141a of the execution environment configuration table 141. The attack destination host ID 148c is an attack destination host ID of each action, and stored with an external key of the host ID 141a of the execution environment configuration table 141. The attack tactics ID 148d is an attack tactics ID used in each action, and stored with an external key of the attack tactics ID 144a of the attack tactics table 144.

The action table 148 is used by the simulation unit 172 in the process of generating an attack scenario.

Next, the reward table will be described with reference to FIG. 12.

The reward table 149 is a table that stores data about the rewards given by the execution of the action at the time of execution of the attack scenario, and as shown in FIG. 12, the reward table 149 has fields of an event ID 149a, an event 149b, and a reward 149c.

The event ID 149a is stored with an identifier that can uniquely identify one record in the reward table 149. The event 149b is stored with the name of the event related to the reward. In the present specification, the event is a term that describes each event when a simulation program is executed. The reward 149c is stored with a value of the reward given when the event of event 149a occurs. In addition, when the event of the simulation executes each action, a negative value of the cost is considered as a reward, and evaluated by reinforcement learning.

The reward table 149 is used by the simulation unit 172 in the process of generating an attack scenario.

Next, the success probability rule table will be described with reference to FIG. 13.

The success probability rule table 150 is a table that stores a rule about the probability of success of an action executed in a state, and has each field of a rule ID 150a, a rule type 150b, a state ID 150c, an attack source host ID 150d, an attack destination host ID 150e, an attack tactics ID 150f, and a success probability 150g.

The rule ID 150a is stored with an identifier that can uniquely identify one record in the success probability rule table 150. The rule type 150b is stored with the name of the rule type. There are three types of rules, and the rule with the rule type "actual experience" is a rule generated by the success probability rule data update process (S1510) to be described later, and reflects the information as a result of executing the attack scenario in the attack scenario execution environment 103. The rule type of "actual machine experience expansion" is a rule generated by the success probability rule data update process (S1510) to be described later, and the generated rule type is a new rule generated based on the rule of "actual machine experience". The rule with the rule type "attack tactics success probability" is a rule that is given a probability of success based on the attack tactics table 144, and the value is updated by a success probability rule data update process (S1510) to be described later, with using the value of the success probability 144e of the attack tactics table 144 as an initial value. The state ID 150c is stored with the state ID of each rule. An external key for referring to the state ID 147a of the state table 147 is stored. In this example, "any" of the value means that the value correspond to any value (the same is applied below). The attack source host ID 150d and the attack destination host ID 150e are an attack source host ID and an attack destination host ID in each rule, respectively, and are stored with an external key for referring to the host ID 141a of the execution environment configuration table 141. The attack tactics ID 150*f* is an external key for referring to the attack tactics ID 144*a* of the attack tactics table 144 in the attack tactics ID in each rule. The success probability 150*g* is stored with the probability that the attack succeeds and transitions to a next state in a combination of the state ID 150*c*, the attack source host ID 150*d*, the attack destination host ID 150*e*, and the attack tactics ID 150*f* as a result evaluated by simulation and actual machine experience.

Next, the attack scenario table will be described with reference to FIGS. 14A and 14B.

The attack scenario table 151 is a table describing the attack scenario and has each field of a step 151*a*, a state ID 151*b*, and an action ID 151*c* as shown in FIGS. 14A and 14B. The example of the attack scenario table 151 shown in FIG. 14A is a table that stores the data generated when the simulation is finished, and the example of the attack scenario table 151 shown in FIG. 14B is an example of a table that stores data when the actual experience is fed back after the simulation, and their structures are the same.

The step 151*a* is stored with the number of each step of the generated attack scenario. The state ID 151*b* is a state at each step of the generated attack scenario, and stored with an external key of the state ID 147*a* of the state table 147. The action ID 151*c* is an action selected at each step of the generated attack scenario, and is stored with an external key of the action ID 148*a* of the action table 148.

The attack scenario table 151 generates the simulation program 162.

Next, the attack command table will be described with reference to FIG. 15.

The attack command table is a table that stores information that breaks down commands that specifically attack from the attack tactics, and as shown in FIG. 15, the attack command table has each field of an attack command ID 126*a*, an attack tactics ID 126*b*, and an attack command 126*c*.

The attack command ID 126*a* is stored with an identifier that can uniquely identify one record in the attack command table 126. The attack tactics ID 126*b* is stored with an external key of the attack tactics ID 144*a* of the attack tactics table 144. The attack command 126*c* is stored with an attack command for executing the attack tactics indicated by the attack tactics ID stored in the attack tactics ID 126*b* in the attack scenario execution environment 103.

The attack command table 126 is used by the attack command unit 190 to execute the attack scenario in the attack scenario execution environment 103. Details of the process of executing the attack scenario will be described later with reference to FIG. 16.

Next, the processing of the attack scenario generation system will be described with reference to FIG. 16 or 20.

First, the outline of the processing of the attack scenario generation system will be described with reference to FIG. 16.

First, the simulation environment generation unit 171 of the attack scenario simulation device 101 reads the execution environment configuration table 141 and the FW rule table 142 from the storage device 134 and generates a simulation environment based on the read data (S1501).

Next, the simulation unit 172 of the attack scenario simulation device 101 executes S1503 to S1510 until the goal set by the user in the attack scenario execution environment or a pre-set timeout time is reached (S1502). In this example, the goal set by the user is a specific result for the user to evaluate the attack scenario, for example, obtaining information of a host or downing.

In S1502, the simulation unit 172 performs the simulation execution (S1503) using the generated simulation environment and generates an attack scenario.

In S1502, the simulation unit 172 executes S1505 to S1509 for each step of the generated attack scenario (S1504).

In S1504, the success probability rule data update unit 173 transmits information of the steps of each attack scenario to the attack scenario execution device 102 (S1505).

Next, the attack command unit 190 of the attack scenario execution device 102 converts the attack tactics in the transmitted step into an attack command with reference to the attack command table 126 (S1506).

Next, the attack command unit 190 executes an attack command in the attack scenario execution environment 103 (S1507). The execution result of the attack command executed in the attack scenario execution environment 103 is transmitted to the attack scenario simulation device 101 (S1508).

Next, the success probability rule data update unit 173 determines the success or failure of the attack command execution result (S1509). As a result, when the execution result fails, the success probability rule data update unit 173 performs a process of updating the success probability rule table 150 (S1510) and comes out of a loop of Step 1504 (S1509: break due to failure of the execution result). If the execution result is not a failure (S1509: otherwise), the process proceeds to the next step S1504.

Next, after coming out of the loop of the S1502, the simulation information visualization unit 174 of the attack scenario simulation device 101 visualizes the results using the finally generated attack scenario (S1511).

An example of the simulation information display screen displayed at this time will be detailed later with reference to FIG. 20.

Next, details of the simulation execution process will be described with reference to FIGS. 17 and 18.

Figure 16:
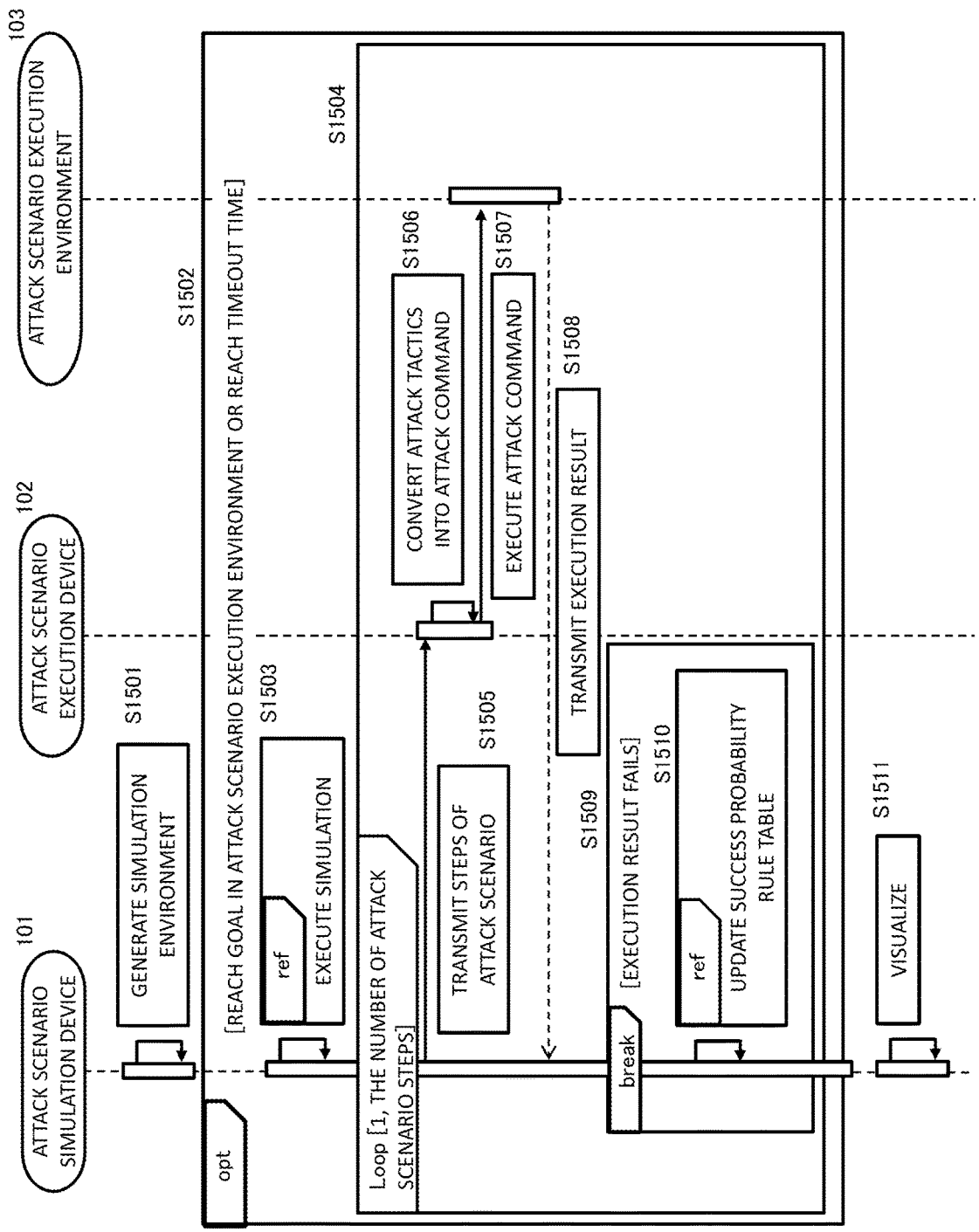
FIG. 16 is a UML sequence diagram showing an outline of the processing of the attack scenario generation system.

The simulation execution process is a process corresponding to S1503 of FIG. 16.

First, the simulation unit 172 determines whether or not a first execution is performed in the loop processing (S1502) (S1601). As a result of the determination, when there is the first execution (yes in S1601), the state value of all states stored in the state table 147 is initialized. The "state value" is a scalar value that evaluates each available state in reinforcement learning, and how to obtain a specific state value in the present embodiment will be described later.

Next, in all available states shown in the state table 147 (values of the state ID 147*a*), the value of the available attack tactics ID is obtained assuming the matching of the value of the attack source host ID 148*b* in the action table 148 with the value of the host ID 147*b* in the state table 147, and the value of prerequisite 144*c*, with reference to the value of the prerequisite 144*c* of the attack tactics table 144. The values of the attack source host ID 148*b*, the attack destination host ID 148*c*, and the attack tactics ID 148*d* of all the executable action IDs 148*a* in the action table 148 including the value of the available attack tactics ID as the value of the attack tactics ID 148*d* are matched with the values of the attack source host ID 150*d*, the attack destination host ID 150*e*, and the attack tactics ID 150*f* of the state ID 150*c* in the success probability rule table 150, respectively. The success probability 150*g* of the success probability rule table 150 corresponding to the matched record is read, and set as the state transition probability that transitions to the state after the event 144*d* occurs at the time of executing the action (S1606).

Next, with the use of the state transition probability for each obtained state and action, the event 144d of the attack tactics table 144, the reward 149c corresponding to the value of the occurring event 149b in the reward table 149, and the cost 144f of the attack tactics table 144 (rewarded with a negative value of the cost 144f), the reward of the occurring event and the negative value of the cost 144f are summed to calculate the expected reward for each action (S1607). The expected reward in this example is a sum of an expected value of the reward when the attack succeeds (event occurs) at the time of selecting an action A and an expected value of the reward when the attack fails (no event occurs, and no state transition occurs) in a state of a value S of the state ID (hereinafter simply "state S"). Specifically, the expected reward is calculated as {state transition probability×((reward+negative value of cost)+(discount factor×state value of the state after transition))}+{(1−state transition probability)×(negative value of cost+(discount factor×state value of the current state)}, and is used to determine the superiority or inferiority of state S indicated by the state ID. The discount factor is a coefficient for expressing the uncertainty of the expected reward obtained in the future, and any value from 0 to 1 is set in advance.

Next, in the state S, the expected reward of the action (interpreted as the best action) with the highest expected reward is set as the state value of the state S (S1608).

Next, it is determined whether or not the update of state value has exceeded a predetermined threshold. As a result, if the state value has been updated (yes in S1609), Step 1603 is executed again.

Figure 17:
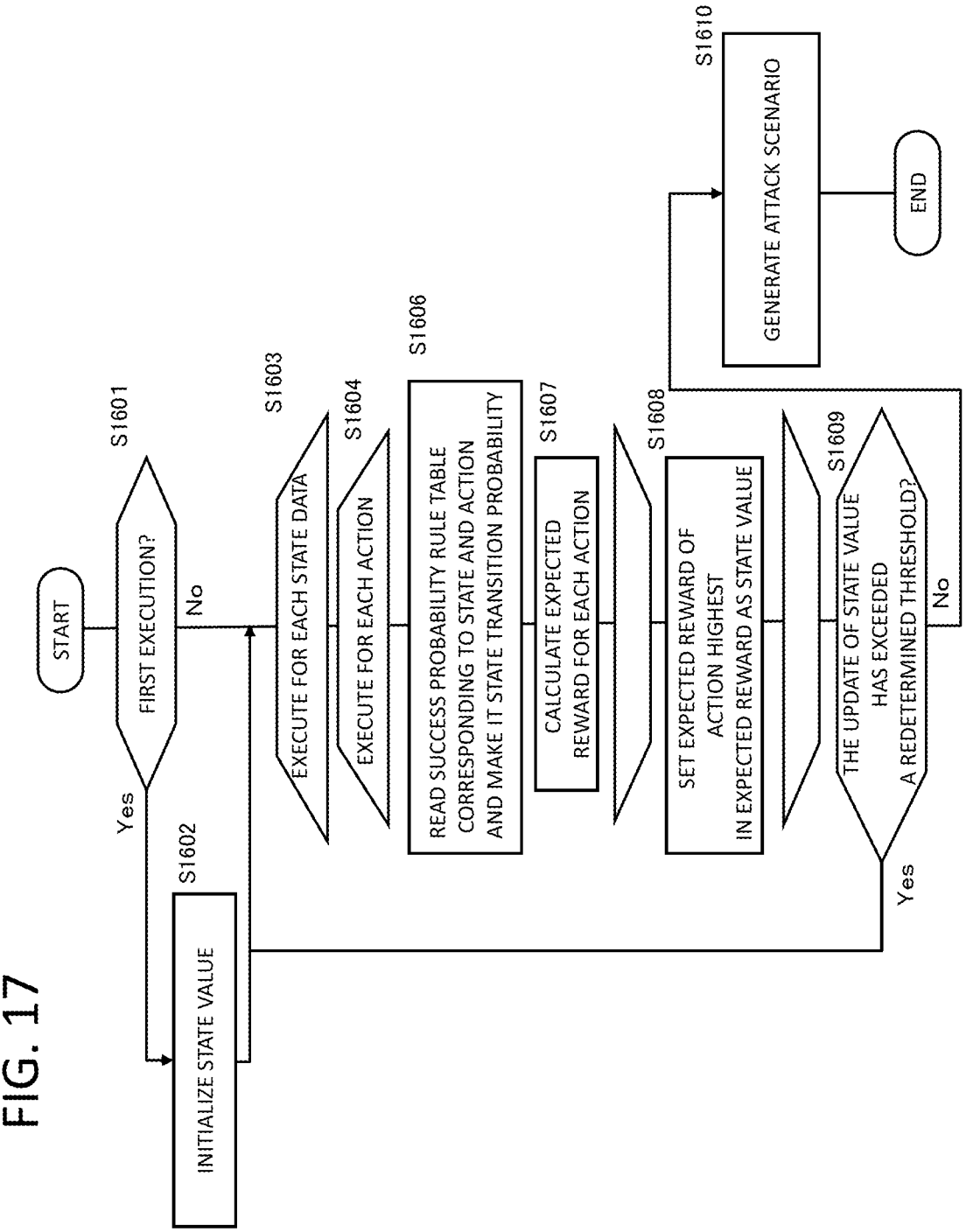
FIG. 17 is a flowchart showing a simulation execution process.
Figure 18:
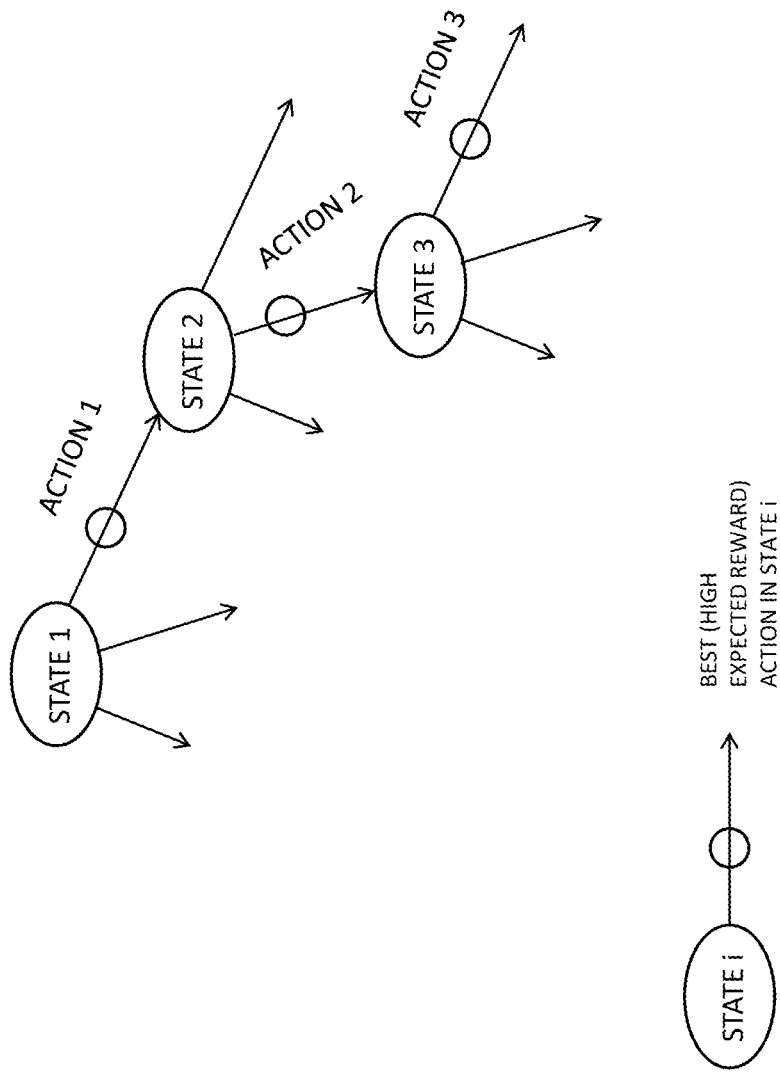
FIG. 18 is a schematic diagram showing a state for generating a directed tree of an attack scenario with states as nodes and actions as edges.

On the other hand, when the state value has not been updated (no in S1609), a calculation process shown in FIG. 17 is interpreted as converged, so that an attack scenario is generated from each obtained state and the best action for the state (in S1608) (see S1610 in FIG. 18) and the process is terminated.

Figure 19:
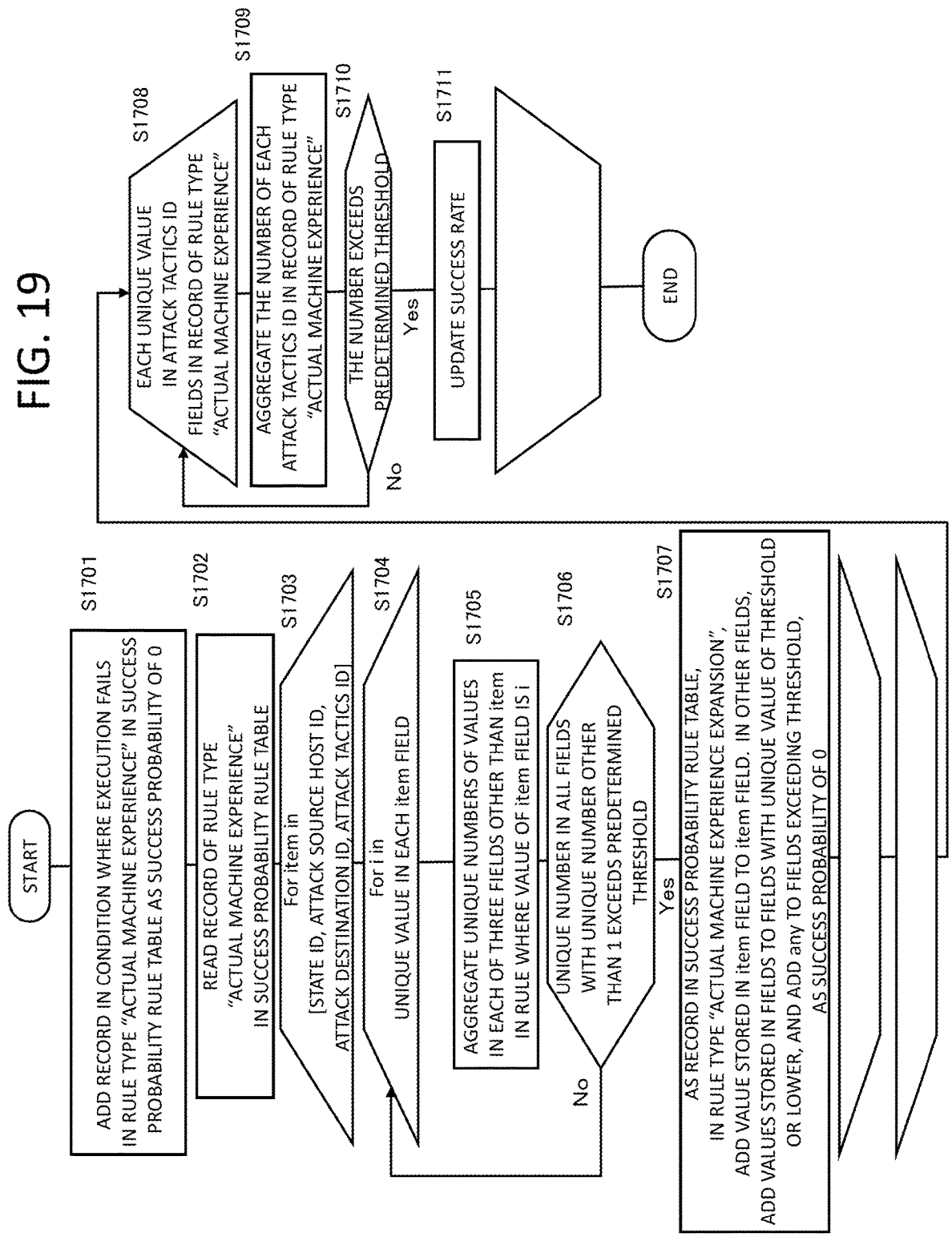
FIG. 19 is a flowchart showing an example of a success probability rule table update process.

Next, the success probability rule table update process will be described with reference to FIG. 19.

The update process is a process corresponding to S1510 of FIG. 16.

First, the success probability rule data update unit 173 of the attack scenario simulation device 101 first adds a record with a value of rule type 150b as "actual experience" as a record of the success probability rule table 150 corresponding to a step in which the execution has failed (S1701). In this case, the state value of the step in which the execution has failed (the value of the state ID 147a in the state table 147) is substituted for the state ID 150c, values obtained from the action of the step in which the execution has failed (the respective values of the attack source host ID 148b, the attack destination host ID 148c, and the attack tactics ID 148d of the corresponding record in the action table 148) are substituted for the target source host ID 150d, the attack destination host ID 150e, and the attack tactics ID 150f, and 0 is substituted for the success probability 150g.

Next, the data of the record that the value of the rule type 150b in the success probability rule table 150 is "actual experience" is read (S1702).

Next, S1704 to S1708 are executed in each field (item) of the read state ID, the attack source host ID, the attack destination host ID, and the attack tactics ID (S1703).

Next, S1705 to S1708 are executed for each unique value (i) of the value stored in the item field (S1704). In this example, the meaning of "for A in B P" about a syntax of the "for in" sentence of FIG. 19 is that elements of B are take out one by one only once and substituted to A to execute the processing of P.

In this loop, the unique number of values is aggregated in each of the three fields other than the item field in the record where the value of the item field is i (each unique value of the value stored in the item field) (S1705). In this example, "unique number" is the number when the duplicate of the field is excluded.

Next, it is determined whether or not the aggregated unique number exceeds a predetermined threshold in each field (S1706). As a result, if the aggregated unique number does not exceed (no in S1706), the process proceeds to the next loop of S1704.

The threshold is a value that is determined according to how many records are summarized as "any" for records to be added as "actual experience expansion". For example, when values greater than 2 are summarized as "any", the threshold value is 2.

On the other hand, if the aggregated unique number exceeds the threshold (yes in S1706), a record is added to the success probability rule table 150 (S1707). In the record to be added, the rule type 150b is "actual experience expansion", and i (each unique value of the values stored in the item field) is put in the field of item. Further, in each field where the unique number is the threshold or lower, the same values as those of the state ID, the attack source ID, the attack destination ID, and the attack tactics ID stored in the field are put in the field, and in each field where the unique number exceeds the threshold, "any" is put in the field, and finally, "0" is put in the success probability 150g.

Next, in the record where the rule type 150b of the success probability rule table 150 is "attack tactics success probability", S1709 to S1711 are executed for each unique value in the field of attack tactics ID 150f (S1708).

In this loop, the number of records in which the rule type 150b of the success probability rule table 150 where the value of the attack tactics ID 150f matches each unique value in the field of the attack tactics ID 150f is "actual machine experience" is aggregated (S1709).

Next, it is determined whether or not the aggregated number exceeds a specified threshold. As a result, if the aggregated number does not exceed the threshold (no in S1710), the process proceeds to the next loop of S1708. On the other hand, if the aggregated number exceeds the threshold (yes in S1710), the value of the success probability 150g is updated to a lower value (S1711).

For example, the success probability 150g in the records of "actual machine experience" where the execution has failed six times with the threshold of 6 for a certain attack tactics is updated to 95% (number multiplied by 95/100 of an original value).

Next, the simulation information display screen will be described with reference to FIG. 20.

The simulation information display screen 1800 has an attack scenario summary display area 1801 and an attack scenario display area 1802 as shown in FIG. 20.

The attack scenario summary display area 1801 is an area in which the transition of the attack in the attack scenario execution environment is drawn by the attack scenario table 151.

The attack scenario display area 1802 is an area in which the contents of the attack scenario table 151 shown in FIG. 14B are displayed.

Next, a specific example of the process shown in FIGS. 16 to 19 will be described.

For example, a simulation environment is built using the execution environment configuration table 141 illustrated in FIG. 4 and the FW rule table 142 illustrated in FIG. 5 (S1501). Under the simulation environment, an attack scenario illustrated in the attack scenario table 151 of FIG. 14A is generated (S1501). The attack scenario is an example in which the action ID=1 is selected when the state ID=1, the state ID transitions to a state ID=2, the action ID=2 is selected when the state ID=2, the state ID transitions to a state ID=3, and finally a goal state becomes a state ID=9.

The attack scenario is then executed in the attack scenario execution environment 103 (S1505 to 1508). In this example, in S1507, the step execution fails in "8" of the step ID 151*a* in the attack scenario table 151 of FIG. 14A. As a result, S1510 is executed.

Then, in S1701, a record of "1" is added to the rule ID 150*a* of the success probability rule table 150 of FIG. 13. Further, when the item is the attack source host ID in S1703 and i is 1 in S1704, the unique number of values of each column obtained as a result of S1705 is 3 in the state ID, 1 in the attack destination host ID, and 3 in the attack tactics ID. In S1706, for example, if the threshold value is set to 2 in advance, the determination of S1706 is yes. Next, in S1707, when any record of "2, 3, and 4" of the values of rule ID 150*a* is added, the unique number becomes "3", and the unique number exceeds the threshold "2", the record of "5" is added to the rule ID 150*a* of the success probability rule table 150 in FIG. 13.

Then, S1503 is executed again to generate the attack scenario illustrated in the attack scenario table 151 of FIG. 14B.

Next, in S1505 to S1508, the generated attack scenario is executed in the attack scenario execution environment 103, and the scenario illustrated in the attack scenario table 151 of FIG. 14B is the final generated attack scenario without corresponding to S1510.

Although the present disclosure has been described with reference to example embodiments, those skilled in the art will recognize that various changes and modifications may be made in form and detail without departing from the spirit and scope of the claimed subject matter.

What is claimed is:

1. An attack scenario simulation computer programmed to simulate an attack on an information processing system and generate an attack scenario against the information processing system, comprising:
 a central processing unit (CPU) configured to execute a program stored in a main memory; and
 a storage memory configured to store state information for each state of the information processing system, attack scenario information describing the state and the attack scenario including a chain of actions that can be taken in the state, action information describing a relationship between the actions and attack tactics, attack tactics information describing a prerequisite for the attack tactics and an event that occurs under the prerequisite, reward information for a reward that occurs for each event, and success probability information that stores a probability of success for each state and each attack tactic;
 wherein the CPU, when executing the program, is configured to:
 obtain an action that transitions from a first state to a second state with reference to the state information, the action information, and the attack tactics information;
 obtain a reward for the action that transitions from the first state to the second state with reference to the reward information, the action information, and the attack tactics information;
 obtain expected rewards for the reward for the action that transitions from the first state to the second state with reference to the success probability information; and
 set the highest expected reward among the expected rewards of the action that transitions from the first state to the second state as a state value of a reinforcement learning of the first state, and generate the attack scenario by the reinforcement learning.

2. The attack scenario simulation computer according to claim 1, wherein the expected rewards are determined based on a state transition probability.

3. An attack scenario generation system that generates an attack scenario for an information processing system, comprising:
 an attack scenario execution environment that simulates the information processing system to be attacked;
 an attack scenario execution computer programmed to perform an attack against the attack scenario execution environment based on the attack scenario; and
 an attack scenario simulation computer programmed to simulate an attack against the information processing system and generate the attack scenario against the information processing system,
 wherein the attack scenario simulation computer includes:
 a central processing unit (CPU) configured to execute a program stored in a main memory; and
 a storage memory configured to store execution environment configuration information describing a host of the attack scenario execution environment, state information for each state of the information processing system, attack scenario information describing the state and the attack scenario including a chain of actions that can be taken in the state, action information describing a relationship between the actions and attack tactics, attack tactics information describing a prerequisite for the attack tactics and an event that occurs under the prerequisite, reward information for a reward that occurs for each event, and success probability information that stores a probability of success for each state and each attack tactic;
 wherein the CPU, when executing the program, is configured to:
 obtain an action that transitions from a first state to a second state with reference to the execution environment configuration information, the state information, the action information, and the attack tactics information;
 obtain a reward for the action that transitions from the first state to the second state with reference to the reward information, the action information, and the attack tactics information;
 obtain expected rewards for the reward for the action that transitions from the first state to the second state with reference to the success probability information; and
 set the highest expected reward among the expected rewards of action that transitions from the first state to the second state as a state value of a reinforcement learning of the first state, and generate the attack scenario by the reinforcement learning.

4. The attack scenario generation system according to claim 2, wherein the attack scenario execution computer reflects the success or failure of the attack performed in the attack scenario execution environment in the success probability of the success probability information according to the attack scenario.

5. The attack scenario generation system according to claim 2, wherein the attack scenario simulation computer displays the state of the attack scenario described in the attack scenario information and information about the action.

6. An attack scenario generation method by an attack scenario generation system that generates an attack scenario for an information processing system, the attack scenario generation system including:
- an attack scenario execution environment that simulates the information processing system to be attacked;
- an attack scenario execution computer programmed to perform an attack against the attack scenario execution environment based on the attack scenario; and
- an attack scenario simulation computer programmed to simulate an attack against the information processing system and generate the attack scenario against the information processing system, the attack scenario simulation computer including a storage memory configured to store execution environment configuration information describing a host of the attack scenario execution environment, state information for each state of the information processing system, attack scenario information describing the state and the attack scenario including a chain of actions that can be taken in the state, action information describing a relationship between the actions and attack tactics, attack tactics information describing a prerequisite for the attack tactics and an event that occurs under the prerequisite, reward information for a reward that occurs for each event, and success probability information that stores a probability of success for each state and each attack tactic, the attack scenario generation method comprising:
- obtaining an action that transitions from a first state to a second state, with reference to the execution environment configuration information, the state information, the action information, and the attack tactics information;
- obtaining a reward for the action that transitions from the first state to the second state with reference to the reward information, the action information, and the attack tactics information;
- obtaining an expected reward of the reward for the action that transitions from the first state to the second state with reference to the success probability information; and
- setting the highest expected reward among the expected rewards of the action that transitions from the first state to the second state as a state value of a reinforcement learning of the first state, and generating the attack scenario by the reinforcement learning.

7. The attack scenario generation method according to claim 6, further comprising reflecting the success or failure of the attack performed in the attack scenario execution environment in the success probability of the success probability information according to the attack scenario.

* * * * *